United States Patent
Suzuki

(10) Patent No.: US 7,203,585 B2
(45) Date of Patent: Apr. 10, 2007

(54) DEVICE FOR CONTROLLING A START OF A VEHICLE

(75) Inventor: Michinobu Suzuki, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 128 days.

(21) Appl. No.: 10/963,631

(22) Filed: Oct. 14, 2004

(65) Prior Publication Data

US 2005/0085977 A1 Apr. 21, 2005

(30) Foreign Application Priority Data

Oct. 16, 2003 (JP) .............................. 2003-355808

(51) Int. Cl.
*F16H 61/02* (2006.01)
(52) U.S. Cl. ........................... 701/51; 340/453; 477/94
(58) Field of Classification Search ...................... None
See application file for complete search history.

(56) References Cited

U.S. PATENT DOCUMENTS 6,817,966 B2 * 11/2004 Avers et al. ................... 477/96

FOREIGN PATENT DOCUMENTS

JP 07-063252 * 3/1995

* cited by examiner

*Primary Examiner*—Michael J. Zanelli
(74) *Attorney, Agent, or Firm*—McGinn IP Law Group, PLLC

(57) ABSTRACT

A device for controlling a start of a vehicle by conducting the shifting operation of a transmission mounted on a vehicle by using a gear change actuator, that includes a starting gear change instruction device that instructs a change of a predetermined starting gear position, a brake operation detection switch for detecting the brake operation of the vehicle, and a controller for controlling the gear change actuator based on the detection signals from the starting gear change instruction device and from the brake operation detection switch. When a change for the starting gear position is instructed from the starting gear change instruction device, the controller controls the gear change actuator so as to shift the transmission to the instructed gear position only when the operation of the brake has been detected.

20 Claims, 3 Drawing Sheets

DEVICE FOR CONTROLLING A START OF A VEHICLE

FIELD OF THE INVENTION

The present invention relates to a device for controlling a start of a vehicle by conducting the shifting operation of a transmission mounted on a vehicle by using a gear change actuator.

DESCRIPTION OF THE RELATED ART

In recent years, there has been put into a practical use a vehicle mounting an automatic transmission that executes a shifting operation of a transmission by using the gear change actuator, the gear change actuator being operated according to a shifting map that has been set correspondingly to the vehicle speed and the depression amount of the accelerator pedal. In the vehicle mounting the above automatic transmission, a starting gear used at a start of the vehicle is set to a predetermined gear position. In a commercial vehicle such as a truck, the starting gear has been set, for example, to the second gear position. However, in the commercial vehicle such as a truck, an empty truck can start at, for example, the third gear position. When loaded up, on the other hand, it is often desired to start at the first gear position. It is, therefore, desired that the starting gear at the start of the vehicle is arbitrarily selected by the will of a driver.

To meet the above demand, JP-A 7-63252 discloses an art equipped with a shift-up/shift-down instruction means wherein, when a shift-up or a shift-down instruction is issued while waiting for the start, the gear change actuator is so controlled as to effect the shift-up or the shift-down from a starting gear that has been set.

The vehicles to which the technology disclosed in the above JP-A 7-63252 is to be applied are those of the type in which the clutch is disconnected while waiting for the start and the shifting operation is effected in a state where the driving force of the engine is not transmitted to the transmission, and since the driver intentionally applies a service brake or a parking brake, the shifting operation can be effected in a state where the vehicle is at a halt. In a vehicle that has a fluid joint such as a fluid coupling or a torque converter arranged between the engine and the transmission and produces a creep, however, the driver takes it for granted that the creeping force acts at all times and hence, makes the vehicle at a halt without applying the service brake or the parking brake. When the shifting operation is effected on a slope without applying the service brake or the parking brake, therefore, it brings about a grave situation that the vehicle starts moving when the transmission is placed a neutral state.

SUMMARY OF THE INVENTION

It is an object of the present invention to provide a device for controlling a start of a vehicle, which inhibits the shifting operation from being shifted to an instructed gear position under a condition where a halt of the vehicle is not secured when the starting gear of the transmission is instructed to be changed while waiting for the start.

To achieve the above object according to the present invention, there is provided a device for controlling a start of a vehicle by conducting the shifting operation of a transmission mounted on a vehicle by using a gear change actuator, comprising:

a starting gear change instruction means for instructing a change of a predetermined starting gear position;

a brake operation detection means for detecting the brake operation of the vehicle; and a control means for controlling the gear change actuator based on the detection signals from the starting gear change instruction means and the brake operation detection means, wherein, when a change for the starting gear is instructed from the starting gear change instruction means, the control means controls the gear change actuator so as to shift the transmission to the instructed gear position only when the operation of the brake has been detected.

It is desired that provision is made of an alarm unit that is actuated by a control signal from the control means, and when the starting gear change instruction means has requested to change the starting gear position, the control means actuates the alarm unit when the brake operation has not been detected.

According to the present invention, when the starting gear change instruction means has instructed to change the starting gear position, the gear change actuator is so controlled as to change the transmission to the instructed gear position only when the brake operation of the vehicle is detected. When the vehicle parking on a slope goes to start, therefore, the vehicle does not start moving even when the transmission is placed in the neutral state in a step where the transmission is going to be shifted to the gear position that is instructed.

DETAILED DESCRIPTION OF THE PREFERRED EMBODIMENTS

Preferred embodiments of a device for controlling a start of a vehicle constituted according to the present invention will now be described in further detail with reference to the accompanying drawings.

Figure 1:
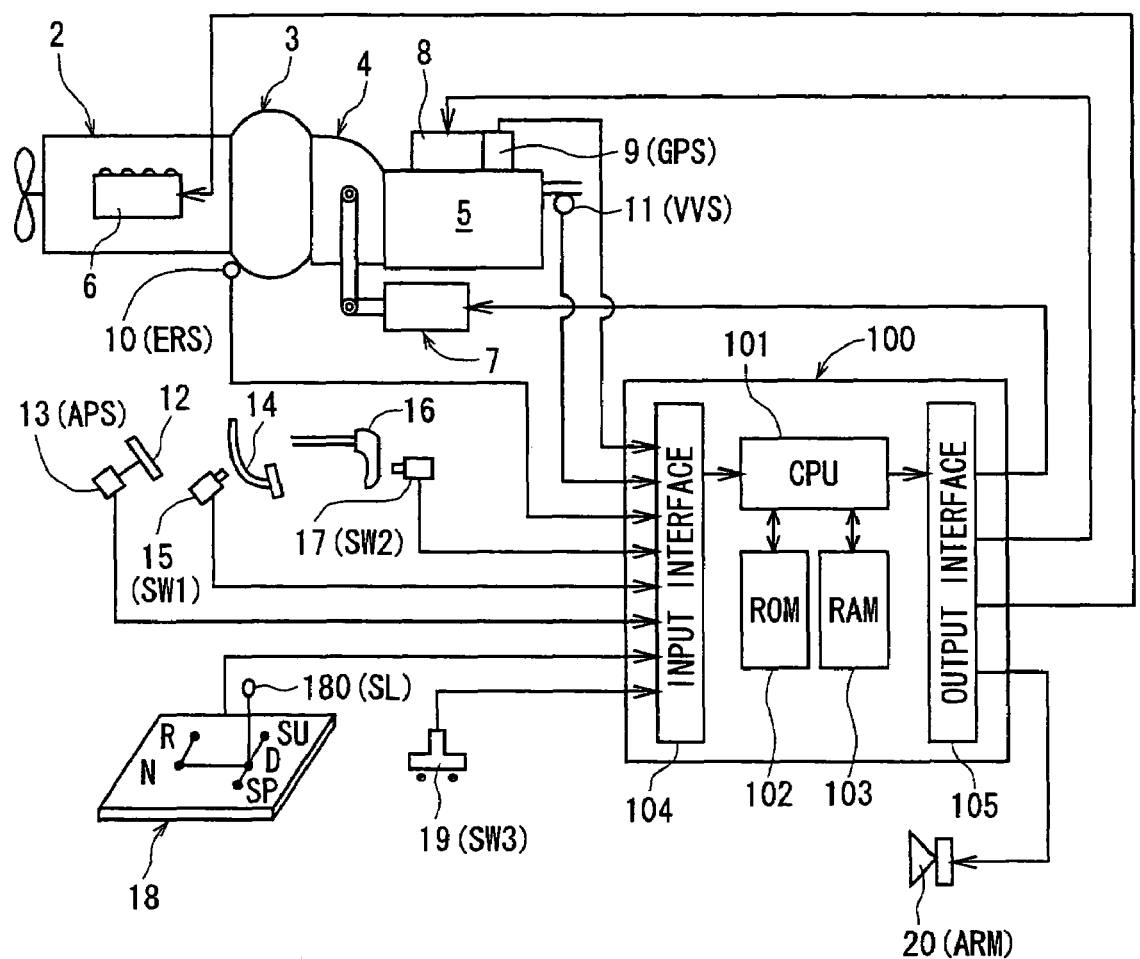
FIG. 1 is a block diagram illustrating the constitution of a device for controlling the start of a vehicle according to the present invention.

FIG. 1 is a block diagram illustrating the constitution of a device for controlling the start of a vehicle according to the present invention. The vehicle is equipped with a device for controlling the start that is illustrated, and mounts a drive unit comprising an engine 2, a fluid joint 3 that is transmission-coupled to the engine 2, a friction clutch 4 transmission-coupled to the fluid joint 3 for connecting/disconnecting the transmission of power, and a transmission 5 of the type of parallel axis gears transmission-coupled to the friction clutch 4, which are arranged in series. In the illustrated embodiment, the engine 2 is a diesel engine equipped with a fuel injection device 6. The fluid joint 3 may be a fluid coupling or a torque converter. The friction clutch 4 is actuated by a clutch actuator 7. The transmission 5 is shifted by a gear change actuator 8 that comprises a select actuator and a shift actuator.

The device for controlling the start of a vehicle in the illustrated embodiment comprises a gear position sensor 9 (GPS) for detecting the shifted position (gear-engaging position) of the transmission 5, an engine rotational speed detection sensor 10 (ERS) for detecting the rotational speed of the engine 2, a vehicle speed sensor 11 (VVS) for detecting the traveling speed of the vehicle from the rotational speed of the output shaft of the transmission 5, an accelerator sensor 13 (APS) for detecting the depression amount of the accelerator pedal 12, a first brake operation detection means 15 (SW1) which is a switch for detecting the operation of the brake pedal 14 of the service brake of the vehicle, i.e., for detecting the operating state of the service brake, and a second brake operation detection means 17 (SW2) which is a switch for detecting the operation of a parking brake lever 16 of the vehicle, i.e., for detecting the operating state of the parking brake. These sensors and detection means send detection signals to a control means that will be described later.

The device for controlling the start of a vehicle in the illustrated embodiment further comprises a shift instruction mean 18 for outputting an instruction signal for each of gear positions of the transmission 5. The shift instruction means 18 is arranged in a cab of the vehicle, and sends an instruction signal for each of positions such as a drive (automatic gear change) position (D), a shift-up position (SU), a shift-down position (SD), a neutral position (N), and a reverse position (R) to a control means that will be described later, by operating a shift lever 180 (SL). The shift lever 180 (SL) can be held at the drive (automatic gear change) position (D), at the neutral position (N) and at the reverse position (R). When the shift lever 180 (SL) has been shifted to the shift-up position (SU) or the shift-down position (SD) and then is released from hand, however, it is so constructed as to return to the drive (automatic gear change) position (D). Further, the device for controlling the start of a vehicle according to the illustrated embodiment has a first gear start switch 19 (SW3) which, when it is desired to start the vehicle at the first gear of the transmission 5, instructs to start the vehicle at the first gear position, and this first gear start switch 19 (SW3) sends an instruction signal to a control means that will be described later. The above-mentioned shift instruction means 18 and the first gear start switch 19 (SW3) work as a starting gear change instruction means for instructing a change of the predetermined starting gear position, as will be described later.

The device for controlling the start of a vehicle in the illustrated embodiment comprises a control means 100. The control means 100 is constituted by a micro computer which comprises a central processing unit (CPU) 101 which executes the operation according to a control program, a read-only memory (ROM) 102 which stores the control program and a shifting map that will be described later, a read/write random access memory (RAM) 103 for storing the operated results, an input interface 104 and an output interface 105. The input interface 104 of the thus constituted control means 100 receives detection signals from the gear position sensor 9 (GPS), engine rotational speed detection sensor 10 (ERS), vehicle speed sensor 11 (VVS), accelerator sensor 13 (APS), first brake operation detection means 15 (SW1), second brake operation detection means 17 (SW2), shift instruction means 18, and first gear start switch 19 (SW3). The output interface 105 sends control signals to the fuel injection device 6, clutch actuator 7, gear change actuator 8 and alarm unit 20 (ARM). The read-only memory (ROM) 102 of the control means 100 stores the shifting map (not shown) set based on the depression amount of the accelerator pedal 12 and the traveling speed of the vehicle.

The device for controlling the start of a vehicle according to the illustrated embodiment is constituted as described above. Described below is the operation.

The control means 100 controls the amount of fuel injected from the fuel injection device 6 based on a detection signal from the accelerator sensor 12. Based on the detection signals from the accelerator sensor 13 and the vehicle speed sensor 11, further, the control means 100 determines an optimum gear based on the shifting map stored in the read-only memory (ROM) 102, and sends a shift control signal to the clutch actuator 7 and to the gear change actuator 8.

Next, described below is the start control of a vehicle. In the illustrated embodiment, the starting gear position is set to the second gear position. Namely, the transmission 5 is engaged at the second gear position when neither the shift-up signal nor the shift-down signal is instructed by the shift instruction means 18 at the time of start and when the first gear position start is not instructed by the first gear start switch 19.

Figure 2:
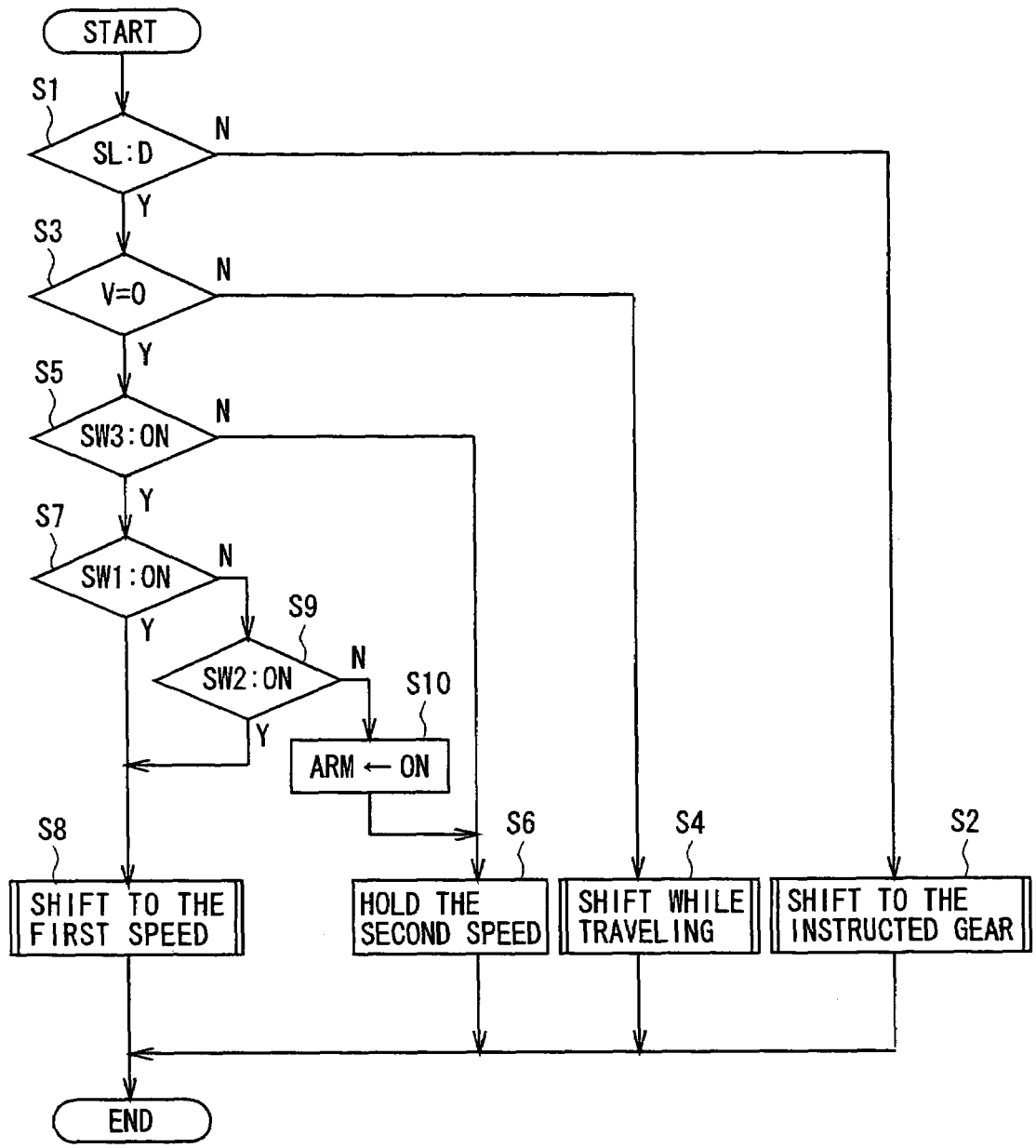
FIG. 2 is a flowchart illustrating a first embodiment of an operation procedure of a control means constituting the device for controlling the start of a vehicle of FIG. 1.

A first embodiment of the start control in the illustrated embodiment will now be described with reference to a flowchart of FIG. 2.

At step S1, first, the control means 100 checks whether the shift lever 180 (SL) of the shift instruction means 18 is at the drive position (D). When at step Si, the shift lever 180 (SL) of the shift instruction means 18 is not at the drive position (D), the control means 100 proceeds to step S2 where a shift control signal is output to the clutch actuator 7 and to the gear change actuator 8 so as to be shifted to a gear position (neutral or reverse in the illustrated embodiment) instructed by the shift lever 180 (SL).

When the shift lever 180 (SL) of the shift instruction means 18 is at the drive position (D) at step S1, the control means 100 proceeds to step S3 to receive a detection signal from the vehicle speed sensor 11 (VVS) and checks whether the traveling speed (V) of the vehicle is zero (0), i.e., whether the vehicle is at a halt. When the traveling speed (V) of the vehicle is not zero (0) at step S3, the control means 100 so judges that the vehicle is not in a halt condition but is in traveling, and proceeds to step S4 to execute the shift control in traveling.

When the traveling speed (V) of the vehicle is zero (0), i.e., when the vehicle is at a halt at step S3, the control means 100 proceeds to step S5 to check whether the first gear start switch 19 (SW3) is turned on. When the first gear start switch 19 (SW3) has not been turned on at step 5, the control means 100, then, proceeds to step S6 to hold a state where the second gear position that has been set as the starting gear position is engaged.

When the first gear start switch 19 (SW3) has been turned on at step S5, the control means 100 proceeds to step S7 to check whether the first brake operation detection means 15 (SW1) has been turned on, i.e., whether the brake pedal 14 of the service brake of the vehicle has been operated. When the first brake operation detection means 15 (SW1) has been turned on at step S7, the control means 100 so judges that the service brake has been operated and the vehicle is at a halt. The control means 100, then, proceeds to step S8 and outputs a shift control signal to the clutch actuator 7 and to the gear change actuator 8 so as to shift the transmission 5 to the first gear position.

When the first brake operation detection means 15 (SW1) has not been turned on at step S7, the control means 100 proceeds to step S9 to check whether the second brake operation detection means 17 (SW2) has been turned on, i.e., whether the parking brake lever 16 has been operated. When the second brake operation detection means 17 (SW2) has been turned on at step S9, the control means 100 so judges that the parking brake has been operated and the vehicle is in a halt state. The control means 100, then, proceeds to step S8 and outputs a shift control signal to the clutch actuator 7 and to the gear change actuator 8 so as to shift the transmission 5 to the first gear position.

When the second brake operation detection means 17 (SW2) has not been turned on at step S9, on the other hand, the control means 100 so judges that neither the service brake nor the parking brake has been operated and the vehicle has not been held in a halt state. The control means 100, then, proceeds to step S10 to actuate the alarm unit 20 (ARM) to notify that the vehicle has not been held in the halt state. The control means 100, then, proceeds to step S6 to hold a state where the second gear position that has been set as the starting gear position is engaged.

According to the first embodiment of start control as described above, when the first gear start switch 19 (SW3) is turned on, it means that either the service brake or the parking brake is operated to hold the vehicle in a halt state. Only when the vehicle is held at a halt, therefore, the shift control to the first gear is permitted. Accordingly, the vehicle does not start moving even when the transmission 5 is placed in the neutral state in a step of being shifted to the first gear at the time of starting the vehicle parking on a slope. In the illustrated embodiment, when neither the service brake nor the parking brake has been operated and the vehicle has not been held in the halt state, the alarm unit 20 (ARM) is actuated to produce an alarm letting the driver know that the vehicle has not been held in the halt state.

Figure 3:
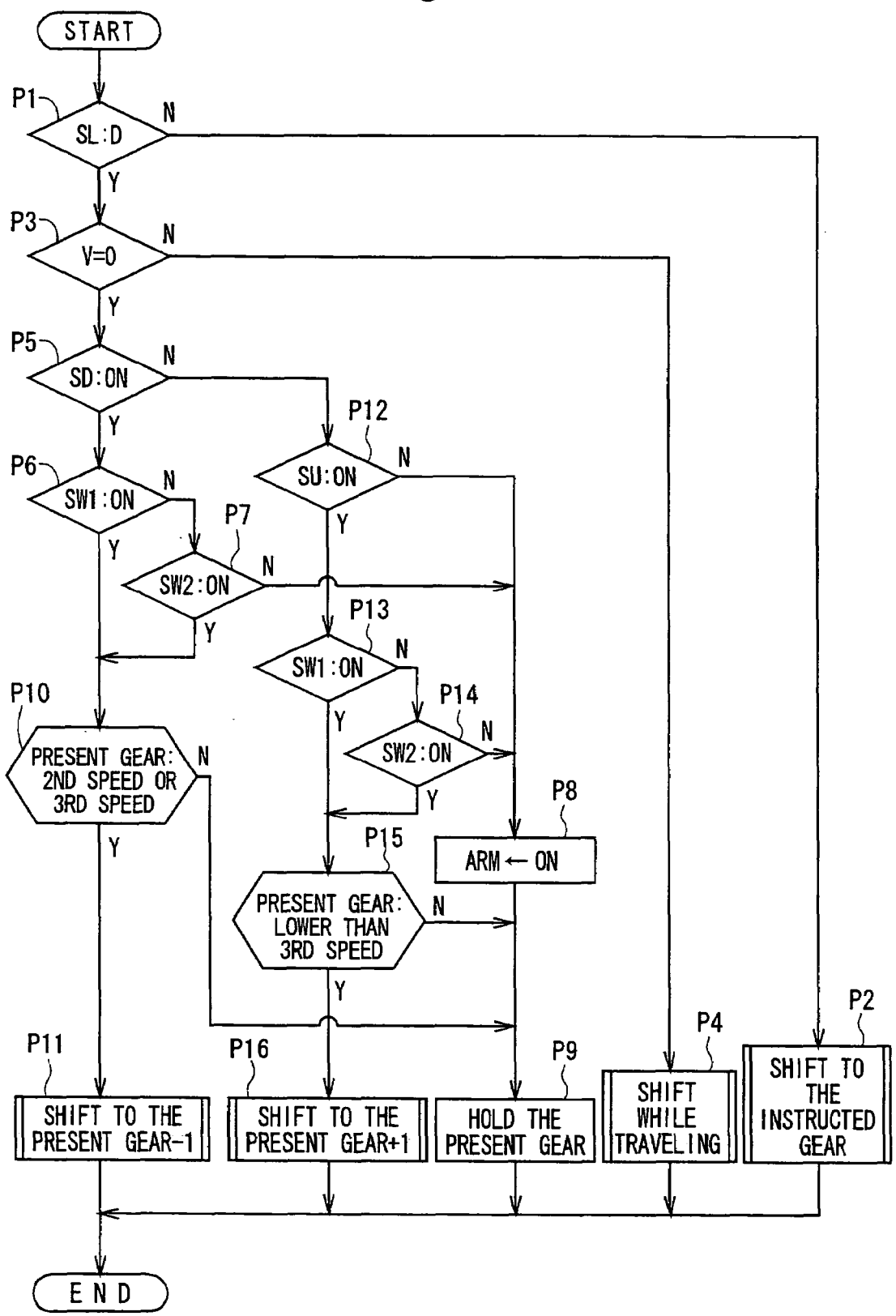
FIG. 3 is a flowchart illustrating a second embodiment of the operation procedure of a control means constituting the device for controlling the start of a vehicle of FIG. 1.

Next, a second embodiment of the start control in the illustrated embodiment will now be described with reference to a flowchart of FIG. 3. In the second embodiment, the gear position capable of starting is the first gear position, the second gear position or the third gear position, and the transmission 5 is engaged at the second gear position when no shift-up or shift-down signal is instructed from the shift instruction means 18 at the start.

At step P1, first, the control means 100 checks whether the shift lever 180 (SL) of the shift instruction means 18 is at the drive position (D). When the shift lever 180 (SL) of the shift instruction means 18 is not at the drive position (D) at step P1, the control means 100 proceeds to step P2 where the transmission is shifted to a gear position(neutral or reverse in the illustrated embodiment) instructed by the shift lever 180 (SL).

When the shift lever 180 (SL) of the shift instruction means 18 is at the drive position (D) at step P1, the control means 100 proceeds to step P3 to receive a detection signal from the vehicle speed sensor 11 (VVS) and checks whether the traveling speed (V) of the vehicle is zero (0), i.e., whether the vehicle is at a halt. When the traveling speed (V) of the vehicle is not zero (0) at step P3, the control means 100 so judges that the vehicle is not in a halt state but is in traveling, and proceeds to step P4 to execute the shift control in traveling. The above steps P1 to P4 are the same as the steps S1 to S4 of the above first embodiment.

When the traveling speed (V) of the vehicle is zero (0), i.e., when the vehicle is at a halt at step P3, the control means 100 proceeds to step P5 to check whether the shift lever 180 (SL) is operated to the shift-down position (SD). When the shift lever 180 (SL) has been operated to the shift-down position (SD) at step P5, the control means 100 proceeds to step P6 to check whether the first brake operation detection means 15 (SW1) has been turned on, i.e., whether the brake pedal 14 of the service brake of the vehicle has been operated. When the first brake operation detection means 15 (SW1) has not been turned on at step P6, the control means 100 proceeds to step P7 to check whether the second brake operation detection means 17 (SW2) has been turned on, i.e., whether the parking brake lever 16 has been operated.

When the second brake operation detection means 17 (SW2) has not been turned on at step P7, the control means 100 so judges that neither the service brake nor the parking brake has been operated and the vehicle has not been held in the halt state. The control means 100, then, proceeds to step P8 to actuate the alarm unit 20 (ARM) to notify that the vehicle has not been held in the halt state. The control means 100, then, proceeds to step S9 to hold the transmission 5 at the present gear position.

When the first brake operation detection means 15 (SW1) has been turned on at step P6 or when the second brake operation detection means 17 (SW2) has been turned on at step P7, the control means 100 so judges that the service brake or the parking brake is operated and the vehicle is held in the halt state. The control means 100, then, proceeds to step P10 to check whether the present gear position of the transmission 5 is the second gear position or the third gear position. When the present gear of the transmission 5 is at the second gear position or the third gear position at step P10, the control means 100 proceeds to step P11 where the transmission 5 is shifted to a gear position of minus (–) 1 from the present gear position, i.e., shifted to the first gear position when the present gear is at the second gear position and is shifted to the second gear position when the present gear is at the third gear position. When the present gear of the transmission 5 is not at the second gear position or the third gear position at step P10, i.e., when the present gear of the transmission 5 is at the first gear position, on the other hand, the control means 100 proceeds to step P9 because there is no gear lower than the first gear position and at step P9, the transmission 5 is held at the present gear, i.e., held at the first gear position.

When the shift lever 180 (SL) has not been operated to the shift-down position (SD) at step P5, the control means 100 proceeds to step P12 to check whether the shift lever 180 (SL) is operated to the shift-up position (SU). When the shift lever 180 (SL) has not been operated to the shift-up position (SU) at step P12, the control means 100 so judges that no change of the starting gear position has been instructed by the shift lever 180 (SL). The control means 100, then, proceeds to step P9 to hold the transmission 5 at the present gear (in this case, the preset gear is at the second gear position).

When the shift lever 180 (SL) has been operated to the shift-up position (SU) at step P12, the control means 100 proceeds to step P13 to check whether the first brake operation detection means 15 (SW1) has been turned on, i.e., whether the brake pedal 14 of the service brake of the vehicle has been operated. When the first brake operation detection means 15 (SW1) has not been turned on at step P13, the control means 100 proceeds to step P14 to check whether the second brake operation detector means 17 (SW2) has been turned on, i.e., whether the parking brake lever 16 has been operated.

When the first brake operation detection means 15 (SW1) has been turned on at step P13 or when the second brake operation detection means 17 (SW2) has been turned on at step P14, the control means 100 so judges that the service brake or the parking brake is operated and the vehicle is held in the halt state. The control means 100, then, proceeds to step P15 to check whether the present gear position of the transmission 5 is lower than the third gear position, i.e., whether the present gear is at the first gear position or at the second gear position. When the present gear position of the transmission 5 is lower than the third gear position, the control means 100 proceeds to step P16 where the transmissions is shifted to a gear position of plus (+) 1 to the present gear position, i.e., shifted to the second gear position when the present gear is at the first gear position and is shifted to the third gear position when the present gear is at the second gear position. When the present gear position of the transmission 5 is not lower than the third gear position, i.e., when the present gear of the transmission 5 is at the third gear position, on the other hand, the control means 100 proceeds to step P9 because no gear higher than the third gear position can start. Therefore, the control means 100 proceeds to step P9 to hold the transmission 5 at the present gear, i.e., at the third gear position.

When the second brake operation detection means 17 (SW2) has not been turned on at step P13, the control means 100 so judges that neither the service brake nor the parking brake has been operated and the vehicle is not held in the halt state. The control means 100, then, proceeds to step P8 to actuate the alarm unit 20 (ARM) to notify that the vehicle has not been held in the halt state, and proceeds to step P9 to hold the transmission 5 at the present gear position.

According to the second embodiment of start control, too, when the shift-up or shift-down is instructed by the shift lever 180 (SL), the shift-up or the shift-down shift control is permitted only when the service brake or the parking brake is operated and the vehicle is held in the halt state. At the time of staring the vehicle parking on a slope, therefore, the vehicle does not start moving even when the transmission is placed in the neutral state in a stage where the transmission 5 is going to be shifted to the instructed gear.

Though the invention was described above by way of illustrated embodiments, it should be noted that the invention is in no way limited to the above embodiments only but can be modified in a variety of other ways without departing from the scope of the invention. In the above embodiments, for example, the operation of the service brake or the parking brake was detected by using a switch that detects the operating position of the brake pedal 14 or the operating position of the parking brake lever 16. However, the operation of the brake may be detected based on a threshold value corresponding to the amount of operation of the brake pedal 14 or the parking brake lever 16. Or, the angle of inclination of the slope may be detected and the threshold value of the amount of operation of the brake pedal 14 or the parking brake lever 16 may be varied corresponding to the detected angle of inclination.

I claim:

1. A device for controlling a start of a vehicle equipped with an engine, comprising:
    a transmission mounted on the vehicle, the transmission conducting a shifting operation by using a gear change actuator;
    a fluid joint mounted between the engine and the transmission;
    a shift lever for controlling the gear change actuator;
    a starting gear change instruction means for instructing a change of a predetermined starting gear position when the vehicle is at a halt;
    a brake operation detection means for detecting the brake operation of the vehicle; and
    a control means for controlling the gear change actuator based on signals from the starting gear change instruction means,
    the control means, when a change for the starting gear position is instructed from the starting gear change instruction means, shifting the transmission to the instructed gear position only when the operation of the brake has been detected.

2. A device for controlling a start of a vehicle according to claim 1, further comprising an alarm unit that is actuated by a control signal from the control means, wherein, the control means actuates the alarm unit when the starting gear change instruction means has instructed to change the starting gear position and the brake operation has not been detected.

3. A device for controlling a start of a vehicle according to claim 1, wherein the predetermined starting gear position comprises a gear that allows the vehicle to move.

4. A device for controlling a start of a vehicle according to claim 1, wherein the starting gear change instruction means comprises a shift instruction means and a first gear start switch.

5. A device for controlling a start of a vehicle according to claim 4, wherein the shift instruction means sends an instruction signal to the control means for each gear position of the transmission.

6. A device for controlling a start of a vehicle according to claim 1, wherein the control means determines an optimum starting gear based on a shifting map stored in a memory of the control means.

7. A device for controlling a start of a vehicle according to claim 1, wherein the starting gear position is one of a first gear, a second gear, and a third gear.

8. A device for controlling a start of a vehicle according to claim 1, wherein engagement of the predetermined starting gear position provides for movement of the vehicle.

9. A device for controlling a start of a vehicle according to claim 4, wherein the first gear start switch is in functional communication with the control means and provides a signal to instruct the vehicle to start at a first gear position of the transmission.

10. A device for controlling a start of a vehicle according to claim 9, wherein the control means outputs a signal to the gear change actuator to shift the transmission to the first gear position of the transmission when the first gear start switch is activated.

11. A device for controlling a start of a vehicle according to claim 9, wherein the control means maintains the transmission at a gear position other than the first gear position when the first gear start switch is activated and the vehicle is not at a halt.

12. A device for controlling a start of a vehicle according to claim 1, wherein the control means detects a position of the shift lever and maintains a present starting gear position when the vehicle is not at a halt and the shift lever is in a shift-down position.

13. A device for controlling a start of a vehicle according to claim 1, wherein the control means detects a position of the shift lever and shifts a gear position of the transmission to a lower gear when the vehicle is at a halt and the shift lever is in a drive gear.

14. A device for controlling a start of a vehicle according to claim 1, wherein the control means detects a position of the shift lever and instructs a gear position change to a higher gear when the predetermined starting gear position is lower than a third gear position and the vehicle is at a halt.

15. A device for controlling a start of a vehicle according to claim 1, wherein the control means detects a position of the shift lever and maintains a detected gear position when the predetermined gear position is not lower than a third gear position and the vehicle is at a halt.

16. A device for controlling a start of a vehicle according to claim 2, wherein the control means detects a position of the shift lever and maintains a detected gear position when the predetermined starting gear position is not lower than a third gear position and activates the alarm unit when the vehicle is not at a halt.

17. A device for controlling a start of a vehicle according to claim 1, wherein the controller allows a shift-up or shift-down of the gear position only when the vehicle is at a halt.

18. A device for controlling a start of a vehicle equipped with an engine, comprising:
- a transmission mounted on the vehicle, the transmission conducting a shifting operation by using a gear change actuator;
- a fluid joint mounted between the engine and the transmission;
- a shift lever for controlling the gear change actuator;
- a first gear start switch;
- a gear position detecting device that detects gear positions of the transmission;
- a brake operation sensor that detects a brake operation of the vehicle; and
- a controller functionally connected to the transmission, the first gear start switch, the gear position detecting device and the brake operation sensor,
- wherein the controller controls the gear change actuator based on signals from the first gear start switch, the gear position detecting device and the brake operation sensor, and when a change for a starting gear position is instructed from the first gear start switch and the gear position detecting device, shifts the transmission to the instructed gear position only when the operation of the brake has been detected.

19. A device for controlling a start of a vehicle according to claim 18, further comprising:
- an alarm unit functionally connected to the controller, wherein the alarm unit is actuated by a control signal from the controller a starting gear position is instructed to change the starting gear position and the brake operation has not been detected.

20. A device for controlling a start of a vehicle according to claim 18, wherein the controller includes a shift map stored in a memory.

* * * * *